(12) United States Patent
McPheters

(10) Patent No.: US 6,377,238 B1
(45) Date of Patent: *Apr. 23, 2002

(54) HOLOGRAPHIC CONTROL ARRANGEMENT

(76) Inventor: Robert Douglas McPheters, 330 E. 38th St., Apt. 17F, New York, NY (US) 10016

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/469,770

(22) Filed: Jun. 6, 1995

Related U.S. Application Data

(63) Continuation of application No. 08/053,238, filed on Apr. 28, 1993, now abandoned.

(51) Int. Cl.⁷ .................................................. G09G 5/00
(52) U.S. Cl. ......................... 345/156; 345/168; 359/33
(58) Field of Search ................................ 345/173, 156, 345/168, 172, 175, 176, 146; 359/13, 33, 630, 35, 23; 341/23; 395/155, 156

(56) References Cited

U.S. PATENT DOCUMENTS

| | | | |
|---|---|---|---|
| 3,340,401 A | 9/1967 | Young | 250/221 |
| 3,372,789 A | 3/1968 | Thiele et al. | 197/98 |
| 3,476,473 A | * 11/1969 | Fend | 359/630 |

(List continued on next page.)

FOREIGN PATENT DOCUMENTS

| | | | | |
|---|---|---|---|---|
| GB | 2249645 | | 5/1992 | |
| JP | 2-210383 | | 8/1990 | |
| JP | 3-217925 | | 9/1991 | |
| WO | 9209944 | * | 6/1992 | 345/173 |

OTHER PUBLICATIONS

R. Collier et al., "Optical Holography," Academic Press, New York, 1971, pp. 137–152, 170–177 and 197–203.
McManus et al., "Switched Holograms for Reconfigurable Optical Interconnect," Feb. 6, 1990, U.S. Statutory Invention Registration No. H738.
P. Hariharan, "Interferometric metrology: current trends and future prospects," in "SPIE vol. 816 Interferometric Metrology," 1976.
Stephen A. Benton, "White–Light Transmission/Reflection Holographic Imaging" in "Applications of Holography and Optical Data Processing," ed. Marom et al., Pergamon Press, Oxford, 1977.
Jearl Walker, "The Amateur Scientist," Scientific American, Sep. 1986, pp. 114–119.
P. Hariharan, "Optical Holography: Principles, Techniques and Applications," Cambridge University Press, 1984, pp. 21–22, 27–29, and 120–128.
J. E. Kasper and S. A. Feller, "The Complete Book of Holograms," John Wiley & Sons, Inc., New York, 1987, pp. 50–59, 97–111 and 136–138.
T. Okoshi, "Three–Dimensional Imaging Techniques," Academic Press, New York, 1976, 186–258.
R. Collier et al., "Optical Holography," Academic Press, New York, 1971, pp. 137–152, 170–177, and 197–203.
"Holographic Key Labeling" D.W. Hulton, *IBM Technical Disclosure Bulletin* vol. 22 No. 6, Nov. 1979, pp. 2505–2506.*

*Primary Examiner*—Regina Liang
(74) *Attorney, Agent, or Firm*—Fitzpatrick, Cella, Harper & Scinto

(57) ABSTRACT

Operator input into one or more devices to be controlled by the operator is provided through a holographic image of the keys or other input devices customarily actuated to provide input data to the system wherein actuation of the holographic image of the input devices is detected optically without tangible physical contact by the operator with a solid control object or control surface.

33 Claims, 5 Drawing Sheets

U.S. PATENT DOCUMENTS

| | | | |
|---|---|---|---|
| 3,735,395 A | * 5/1973 | Iwabuchi | |
| 3,949,235 A | * 4/1976 | Miyazaki et al. | 250/550 |
| 4,145,945 A | 3/1979 | Iyeta | 84/1.18 |
| 4,256,927 A | 3/1981 | Treheux et al. | 179/18 E |
| 4,593,967 A | 6/1986 | Haugen | 350/3.71 |
| 4,779,025 A | * 10/1988 | Paynton et al. | 345/173 |
| 4,818,048 A | 4/1989 | Moss | 350/3.7 |
| 4,882,582 A | * 11/1989 | Oka | 345/168 |
| 4,884,073 A | 11/1989 | Souloumiac | 341/31 |
| 4,885,574 A | * 12/1989 | Negishi et al. | 345/168 |
| 5,097,252 A | 3/1992 | Harvill et al. | 340/540 |
| 5,398,045 A | * 3/1995 | Sach et al. | 345/172 |

* cited by examiner

HOLOGRAPHIC CONTROL ARRANGEMENT

This application is a continuation of application Ser. No. 08/053,238, now abandoned, filed Apr. 28, 1993.

BACKGROUND OF THE INVENTION

The present invention relates generally to a holographic operator interface to electronic or electromechanical devices such as data processing units or computers and, more particularly, to a holographic operator interface where there is no tangible physical contact between the operator and the control elements of the operator interface as the input devices are holographic images of the keys or other customarily touch-activated tangible input devices. Operator interaction is detected through electromagnetic or other means, thereby obviating the need for direct physical contact with a solid input object or surface.

There are many methods and devices available for entering data and commands into computers, such as pushbuttons, keyboards, trackballs, mice and light pens. All of these input devices share a common disadvantage in that they require tangible physical contact by the user of the computer or electronic device. The repetitive physical effort required to operate solid keyboards has been shown to cause or promote physical maladies, including carpal tunnel syndrome. Even where only one person uses the input device it is inherently subject to wear and damage because of the mechanical aspects of these input devices. Where many individuals use an input device throughout the day, such as in a bank's automated teller machine, problems of normal wear and tear are exacerbated by constant use, a potentially inhospitable environment and hygiene concerns. These hygiene concerns are particularly relevant in sterile environments such as a hospital operating room where it is desirable to control electronic equipment without physical contact that may compromise sterility. These standard input devices share an additional disadvantage in that one input device cannot be commonly used to control several electronic devices without physically disconnecting and reconnecting the input devices, thereby necessitating the use of several similar input devices rather than one remotely connected input device. Additionally, changing the notation or arrangement of the input devices is generally impractical because of the problems inherent in replacing keycaps or altering a keyboard arrangement.

Electromechanical keyboards and keypads are the most common operator interface for inputting data and commands into electronic devices such as computers. However, these devices are unsuitable for certain environments and it is considered desirable to reduce the use of electromechanical relays because of their inherent problems. Furthermore, they have been shown to cause or promote the aforementioned physical maladies in part because they require the repeated application of physical pressure. Previous attempts to provide operator input without using electromechanical devices have included a "Keyboard With Immobile Touch Switches," U.S. Pat. No. 3,372,789, issued Mar. 12, 1968 to H. Thiele et al. and a "Motionless Data Input Key," U.S. Pat. No. 3,340,401, issued Sept. 5, 1967 to J. E. Young. The devices disclosed in these patents, while eliminating the need for electromechanical relays, still require the user to physically touch the input device to actuate it.

Although holographic images are used in other operator interfaces, they are used as visual output devices (displays) rather than as input devices. Head-up displays such as those used in aircraft or the "Holographic Head-Up Control Panel" described in U.S. Pat. No. 4,818,048 issued Apr. 4, 1989 to G. Moss exemplify this use of holograms in output devices. In these implementations of operator interfaces the holographic image provides information and feedback responsive to the operator's actuation of solid controls separate and distinct from the holographic image.

This invention is directed toward providing a means by which an operator may control one or more devices without touching a solid control object or surface while still interacting with familiar controls that are visually perceived, such as a keyboard.

SUMMARY OF THE INVENTION

The present invention provides an interface between an operator and a device to be controlled. The operator interface includes an input interface that permits the operator to input data and commands into a device such as a computer without requiring physical contact. The input interface includes a holographic image of a physical input device—the operator activates the input interface without physically touching a solid control surface. The input interface is activated when the user passes a finger or pointer through the holographic image of a key or other input device. Operator actuation is detected through electromagnetic radiation or sound energy, allowing the operator to use familiar key controls while avoiding physical contact.

The input interface incorporates a three-dimensional holographic image of a keyboard or other input device projected from a hologram of the input device. The hologram may be either a reflection hologram or a transmission hologram, the type of hologram used dictating the relative position of the light used to project the three-dimensional holographic image.

The operator interface may optionally include an output interface, such as a conventional video display used in personal computers.

DETAILED DESCRIPTION

Figure 1:
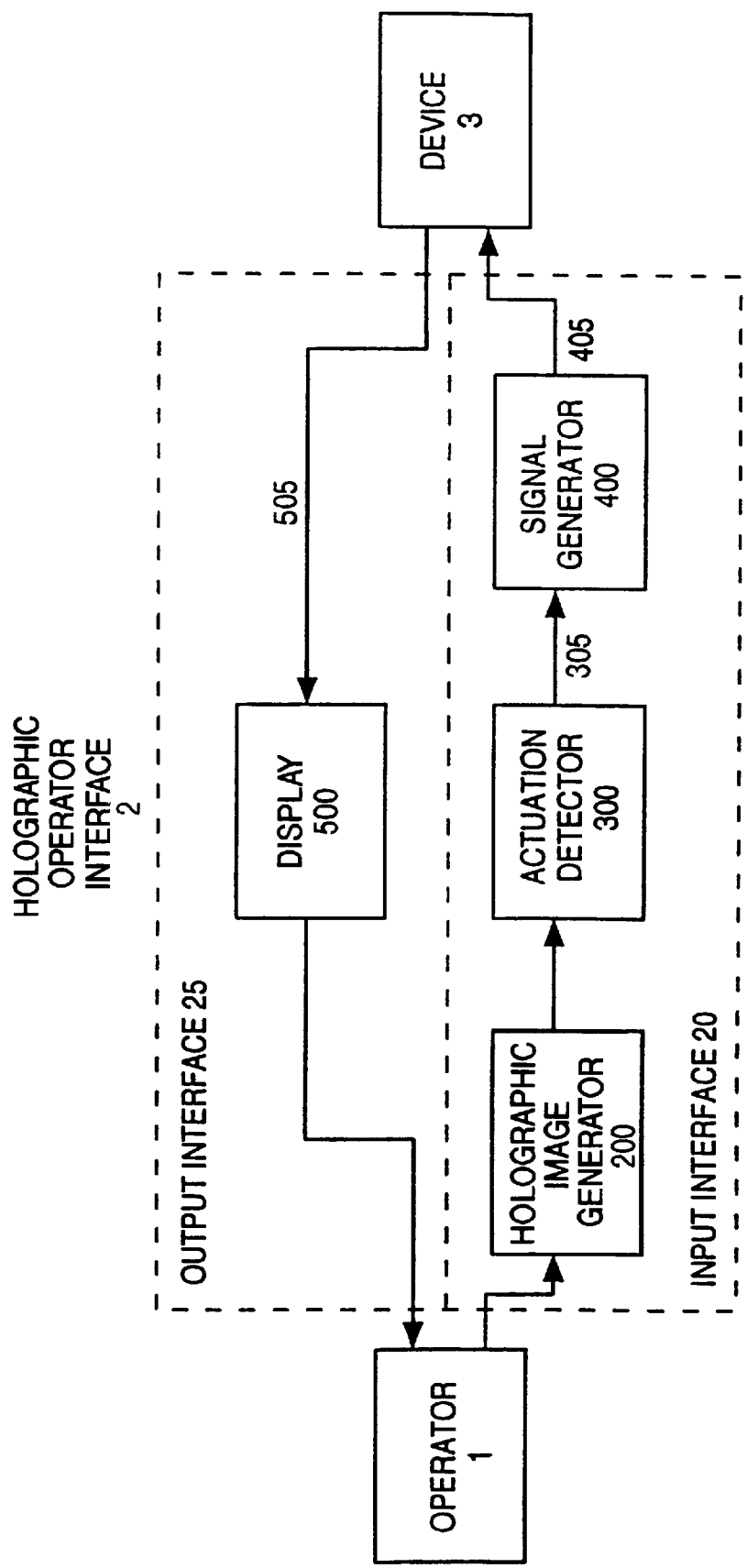
FIG. 1 is a schematic functional representation of a holographic operator interface according to the principles of the invention.

FIG. 1 schematically illustrates a holographic operator interface 2 between an operator 1 and a device 3 to be controlled by the operator 1. Device 3 may be an electronic device such as a computer or any other device into which it is desired to provide user input through a keyboard, keypad or other input device and which may provide visual or other output to the operator. Such devices can include automatic teller machines, electronic cash registers, personal computers, calculators, data entry keypads, system controls, weapons systems, musical instruments, electronic testing equipment, video recorders, televisions, telephones and switchboards.

The operator interface 2 includes an input interface 20, which includes a holographic image generator 200, an actuation detector 300, and a signal generator 400. The operator interface 2 may optionally include an output interface 25, which can include a display 500.

The holographic image generator 200 generates a holographic image of an input device such as a keyboard. The operator can see the image of the input device and actuate the input interface 20 by penetrating the image with a finger or other pointer. Actuation detector 300 senses the operator's physical indications, determines which part of the input device image the operator actuated, and conveys that information to the signal generator 400. Signal generator 400 incorporates the means needed for communication between actuator detector 300 and the device 3. Signal generator 400 provides input signals to the device 3 which may, for example, correspond to standard input signals from electro-mechanical keyboard or keypad input devices. Thus, the operator's manipulation of the image generated by the image generator 200 is ultimately conveyed by signal generator 400 to the device 3 that the operator wishes to control. In this manner, the control arrangement according to the present invention enables a desired input control to be effectuated by determining and detecting the logical sequence of sections of a holographic control device image selected by the operator. Thus, by the present invention, the overall appearance and familiarity of operation of conventional input devices, such as keyboards, data entry keypads and the like, is retained, while the need to physically touch such input device for actuation is eliminated.

Each of the functional components of the operator interface 2 may be physically separated from each other and from the device 3—the image generator 200 need only generate an image that is physically accessible to the operator 1, and the display 500 need only be visible to the operator. Thus, the image generator may be physically separated from the actuation detector 300, so that the sensing of the operator's manipulation of the image may be done remotely. The actuation detector may be physically combined with or separated from the signal generator 400, which in turn may be combined with or separated from the device 3. The display 500 may be combined with or separated from any of the other components. Information to be communicated between the actuation detector 300, signal generator 400, and device 3, and between device 3 and display 500, may be communicated via any suitable data link (indicated in FIG. 1 as links 305, 405, and 505). Each such data link may include any suitable means for communicating data, such as a multi-conductor wire or an infra-red or radio frequency link of the kind commonly used for microcomputer keyboards and entertainment device remote controls.

Figure 2:
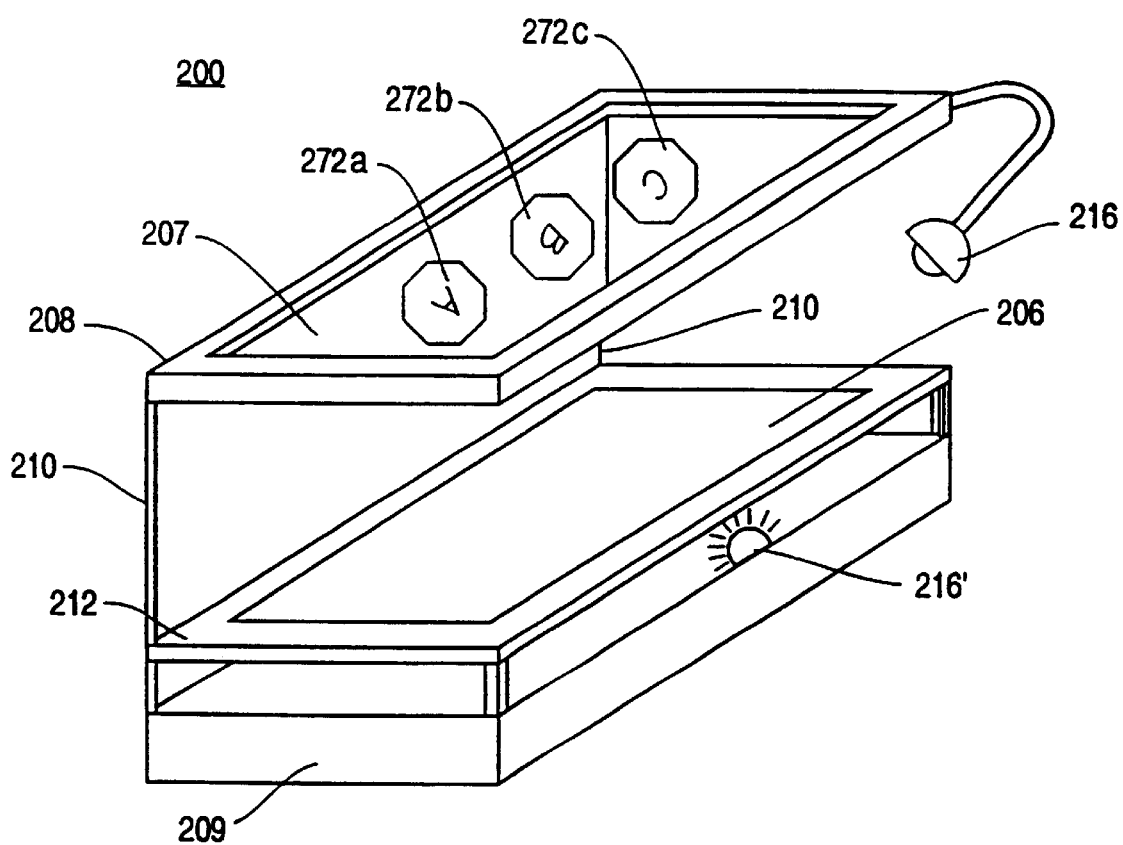
FIG. 2 is a schematic representation of an image generator used in the operator interface of FIG. 1.

As illustrated schematically in FIG. 2, image generator 200 provides an intangible input device in the projected holographic image 207 of an input device recorded in hologram 206. The image may include images of individual keys 272a, 272b, and 272c. Hologram 206 is disposed on body 209 (such as by mounting on a support 212, which may be transparent if a transmission hologram is used). Holographic image 207 is projected above hologram 206 and body 209 such that holographic image 207 appears approximately coplanar with an image frame 208 supported on the mounting body 209 by suitable supports 210. The image frame 208 may provide a wrist rest for the operator, and may support an upper illumination source 216. Alternatively, a lower illumination source 216' may be used, as described below. Mounting body 209 may also house the actuation detector 300 and/or the signal generator and their associated electronics, a power supply, and any other related equipment.

Figure 5:
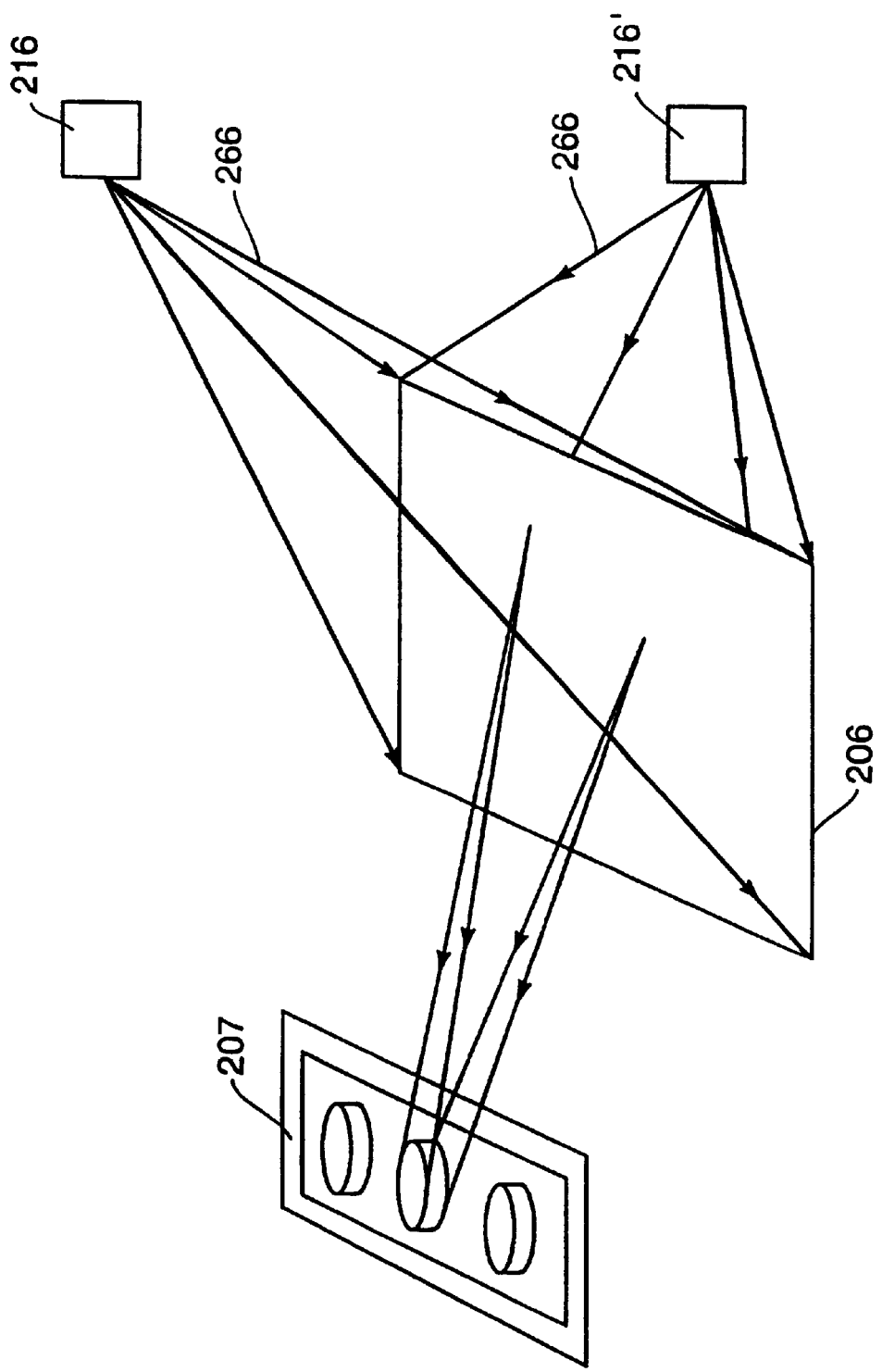
FIG. 5 is a schematic representation of the relative position of a hologram, a holographic image, and an illumination source for use in the image generator of FIG. 2.

As is well known in the art, a hologram is a photographic record of the interference pattern formed by two light beams, a reference beam directed toward the photographic film and an object beam reflected from the object to be shown in the hologram. When a hologram is illuminated by a reconstruction beam, it produces a real image (which appears to be between the plane of the hologram and the viewer) and a virtual image (which appears to be behind the plane of the hologram). As illustrated in FIG. 5, it is preferred that the holographic image 207 produced from the hologram 206 by reconstruction beam 266 appear to the operator (the operator's eye being represented schematically in FIG. 5 at 10) to be located between the operator and the hologram 206, so that the operator can "touch" the holographic image 207 without encountering the hologram 206. Thus, it is preferred that the holographic image 207 be a real image.

However, with a conventionally-developed hologram, the real image appears to be inverted (i.e. a mirror image)—it is thus pseudoscopic. This may be undesirable for an image of an operator interface such as a keyboard. However, a true, or orthoscopic, real image may be produced by a process of double inversion whereby a second hologram is made of the pseudoscopic real image of a hologram of an actual object. The resulting real image from the second hologram, being a pseudoscopic image of a pseudoscopic image from the first hologram, is therefore orthoscopic. Hologram 206 is preferably formed pursuant to this procedure so as to create an orthoscopic image of the input device. The procedures for forming such a hologram can be found in known reference works such as "Optical Holography" by Collier et al., Academic Press, New York (1971), "Three-Dimensional Imaging Techniques" by Okoshi, Academic Press, New York (1976), and "Optical Holography: Principles, Techniques and Applications" by Hariharan, Cambridge University Press, Cambridge (1984).

Holographic image 207, projected from hologram 206, is an orthoscopic real image of the input device and is disposed so as to be approximately coplanar with image frame 208. As the artisan will recognize, if hologram 206 is a transmission hologram, the illumination source 216' providing the reconstruction beam 266 for holographic image 207 is positioned behind hologram 206 relative to the operator, whereas if hologram 206 is a reflection hologram the illumination source 216 is positioned on the same side of the hologram as the operator. As is well known in the art, conventional holograms require a coherent reconstruction beam, while other types of holograms are viewable in incoherent white light. Thus, if the hologram 206 is a white-light hologram, the illumination source 216 may be a source of incoherent light, such as a halogen lamp, while if the hologram 206 is a conventional hologram, the illumination source 216 must be a source of coherent light, such as a laser.

The placement of the illumination source 216 may also vary with the physical configuration of the input interface 20 and the environment in which it is operated. For example, if the image generator 200 is to be stationary (as, for example, if it is used with a bank's automated teller machine), the illumination source may either be mounted to the base 209 or may be mounted remotely from the base, such as on the device 3, or on a nearby but separate structure. If the image generator is to be movable, the illumination source 216 should be mounted in a fixed relationship to the image generator so that the incident angle of the reconstruction beam on the hologram remains fixed.

Techniques for generating a holographic image from either a transmission or reflection hologram are well known in the art and can be found, for example, in the above listed reference works. Techniques for creating and viewing rainbow holograms are described in "White Light Transmission/Reflection Hologram Imaging" in "Applications of Holography & Optical Data Processing" by Benton, ed. Marom et al., Pergamon Press, Oxford (1977).

The operator 1 is thus presented with a holographic image 207 of an input device. The operator interacts with the image by passing a finger or pointer through the apparent plane of the image 207. Detection and interpretation of operator interaction with the holographic image 207 is performed by the actuation detector 300. As described above, the actuation detector may be connected to, or may be physically separated from, the image generator 200. In the preferred embodiment, the image generator 200 and actuation detector 300 are physically integrated.

Figure 3:
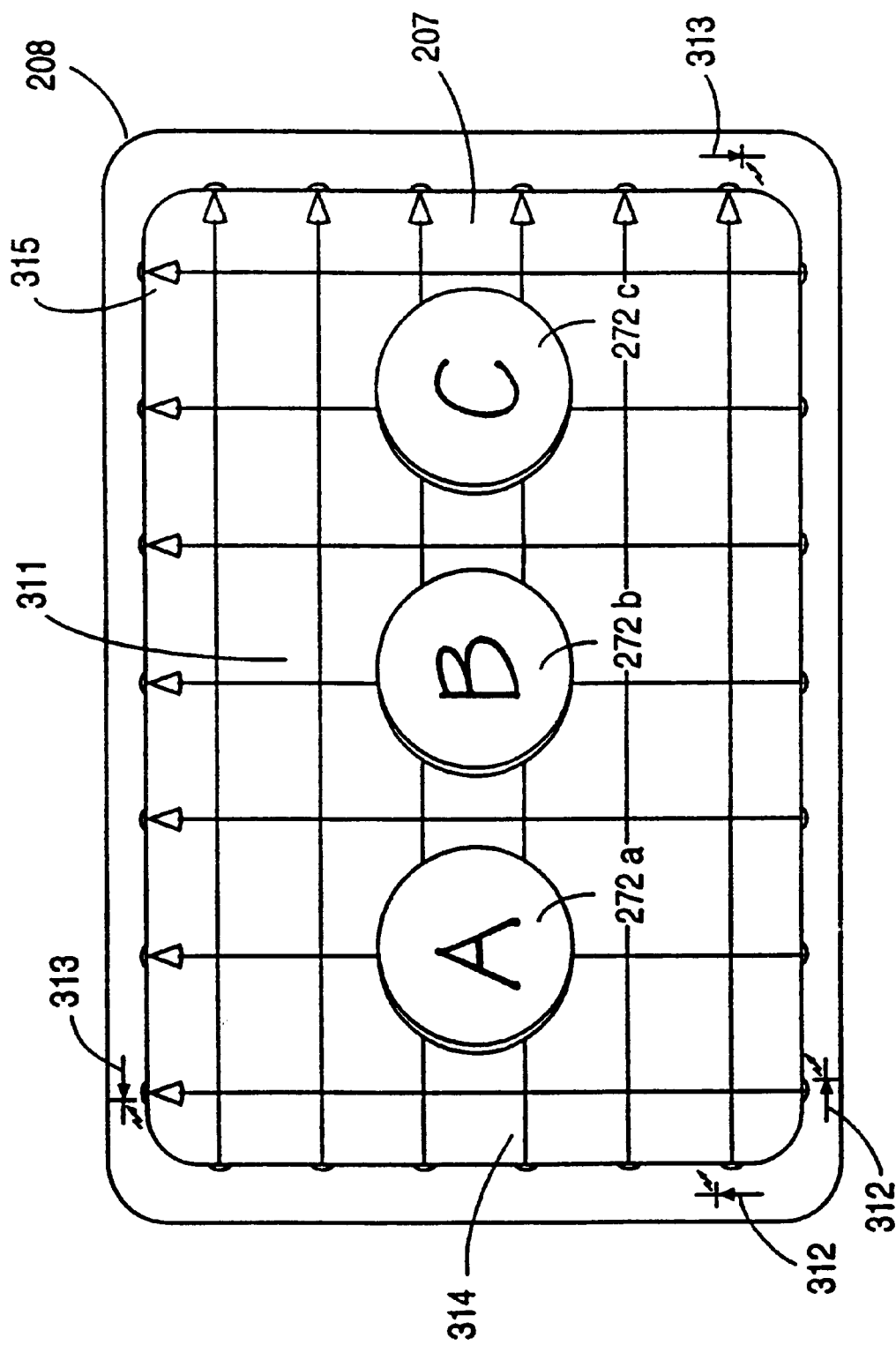
FIG. 3 is a schematic representation of a first embodiment of an input actuation detector used in conjunction with the image generator of FIG. 2.

As illustrated in FIG. 3, the actuation detector 300 may consist of an optical detection matrix 311 integrated with image frame 208. Image frame 208 is formed as a rectangular polygon approximately coplanar with and peripherally encompassing holographic image 207. Optical detection matrix 311 consists of photoemitters 312 and corresponding photoreceptors 313 arranged such that two or more mutually perpendicular detection beams 314 and 315 are blocked when the operator actuates a unique element (such as individual keys 272a, 272b, or 272c) of the input device by "touching" the corresponding portion of the holographic image 207. The identity of the intersected detection beams can be correlated with the key that has been actuated by any suitable technique, such as be reference to a look-up table. Such an optical detection matrix (but using a physical keyboard) is described in U.S. Pat. No. 4,884,073 issued Nov. 28, 1989 to A. Souloumiac.

Figure 4:
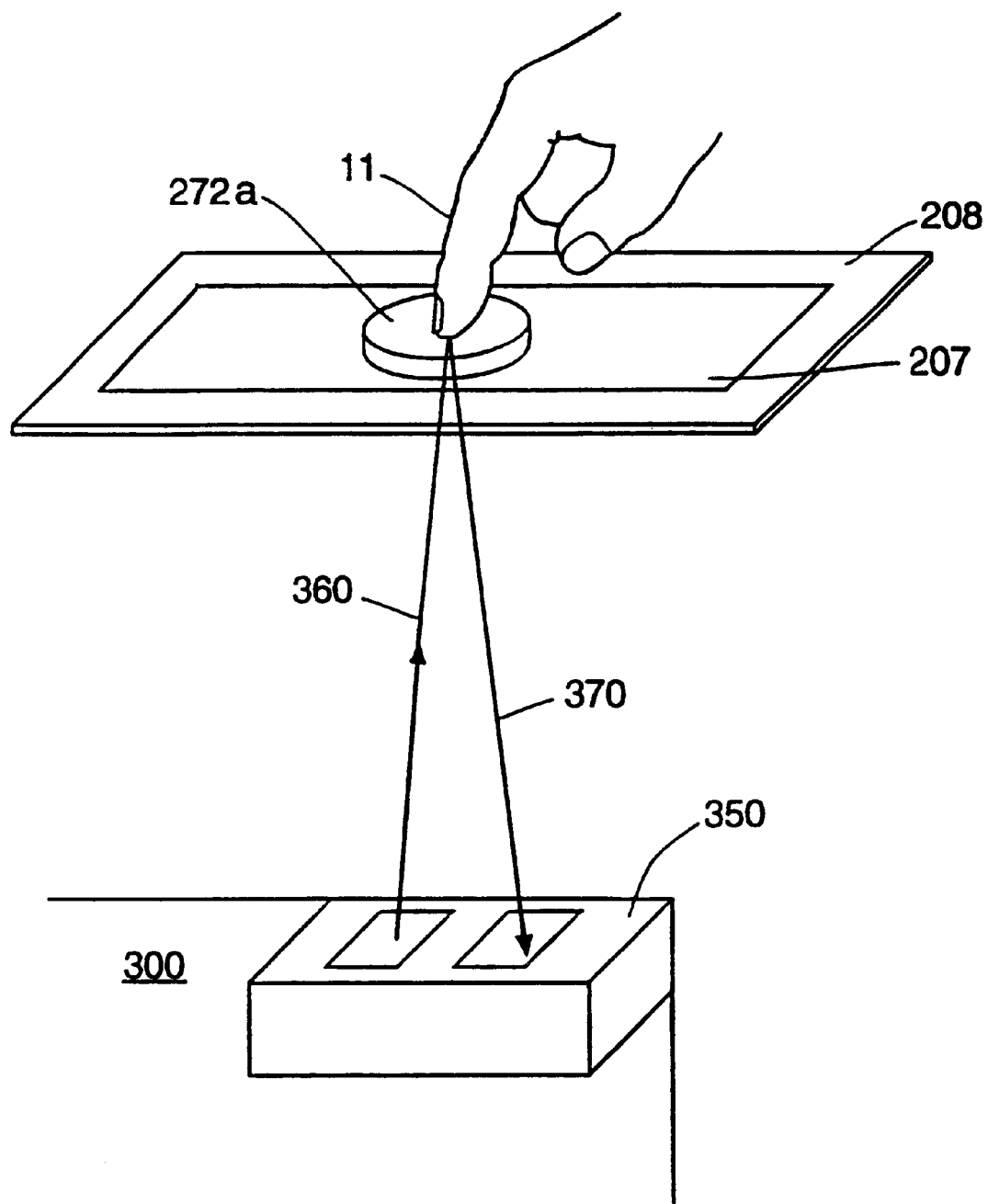
FIG. 4 is a schematic representation of a second embodiment of an input actuation detector.

In an alternative embodiment, actuation detector 300 may incorporate a laser measuring device utilizing measuring techniques such as the real-time three dimensional optical scanning device described in the "3-D Active Vision Sensor," U.S. Pat. No. 4,593,967, issued Jun. 10, 1986 to P. Haugen, the disclosure of which is hereby incorporated by reference. This technique involves measuring the distance to an object (or a series of points on an object) by reflecting a laser beam from the object. As illustrated in FIG. 4, such a laser scanning device 350 thus detects operator interaction by scanning the region bounding the holographic image 207 (as defined, for example, by the image frame 208) with a scanning laser beam 360 in a raster pattern. The scanning beam 360 will be reflected by any physical object in its path, and a reflected beam 370 will be returned to the laser scanner 350. As described in Haugen, the location of the reflecting object can be determined by the relative angle between the beams.

The laser scanner 350 may be configured to disregard any reflected beam 370 from an object that is nearer to the operator than the plane of the image 207. However, the presence of a physical object (such as the operator's finger, indicated in FIG. 4 as 11) sensed by the laser scanner 350 that is closer to the scanner than the plane of the image would be interpreted as an operator interaction with the holographic image. The position of the object would then be correlated with the key (such as 272a) that has been actuated by any suitable technique, such as described above for the optical detection matrix 311.

As the artisan will recognize, the rate at which the laser scanner 350 scans the plane of the holographic image 207 should be sufficiently high to ensure that the momentary intrusion of a pointer or the operator's finger through any virtual key will be detected. Similarly, the relative orientation of the laser scanner and the holographic image 207 are important. The laser scanner will be most readily able to determine the location of the intruding physical object if the plane of the holographic image 207 is most nearly perpendicular to the scanning beam 360 from the actuation detector 300. The location of the object within the plane of the image cannot be readily determined if the plane of the image is parallel to the scanning beam.

The laser scanner 350 may be disposed either adjacent the image generator (such as on the base 209) or may be remote from the image generator (such as on the device 3). In the latter case, if the position of the image generator 200 will not be fixed relative to the laser scanner 350, some means should be provided for defining the relative location and orientation of the holographic image 207 and the laser scanner so that the laser scanner can determine when a object has penetrated the plane of the image and which portion of the image has been penetrated.

One suitable technique is to use the image frame 208 as a reference frame. Again, image frame 208 is formed as a rectangular polygon approximately coplanar with and peripherally encompassing holographic image 207. The frame is readily detectable by the laser scanner, provided that the frame is within a region to be scanned by the detector. Since the dimensions of the frame are known, the orientation of the frame relative to the beam of the detector can be determined. The location of any physical intrusion through the plane of the image can then be determined and correlated with the key actuated by the operator. The scan rate of the detector and the region it is to scan should be selected so that the image frame 208 will not be moved outside of the scan region between scans for an anticipated movement velocity.

Other suitable techniques for detecting operator actuation of the image 207 include ultrasonic or infrared ranging techniques (such as are used in autofocus cameras), or other laser ranging techniques such as those described in "Interferometric Metrology: Current Trends and Future Prospects" by P. Hariharan at Proceedings of the SPIE, vol. 816, pp. 2–18, Bellingham, SPIE (1987).

Operator interface 2 may be used to provide input to several devices. Hologram 206 may be interchanged on image generator 200 so as to generate holographic image 207 particularly corresponding to a particular device to be controlled. Actuation detector 300 and signal generator 400 may be integrated into each device 3 or designed so as to correctly interpret a plurality of input devices. As the artisan will recognize, alternative permutations may be utilize to provide multiple inputs to multiple devices 3 from a single operator interface 2.

The operator interface 2 may optionally include an output interface 25, which, as described above, may include a display 500. The display 500 may be a conventional video display device, such as a liquid crystal display (LCD) of the type commonly found in personal computers and portable video games. The video display may be mounted to the device 3 or may be physically separated from it. For example, where proximate operator feedback in a conventional relationship with the operator input device is desired, the display may be mounted on the body 209 of the image generator 200, which may be physically separated from, and movable relative to, the device 3. In either arrangement, video signals to the display 500 would be transmitted from the device 3 via data link 505.

What is claimed is:

1. A control arrangement for allowing an operator to control an electronic or electro-mechanical device of the type conventionally controlled by a tangible control mechanism having at least one customarily touch-activated tangible input object, physical contact with which produces a response by said device; said control arrangement allowing such control without the operator touching any solid object and comprising:

an image generator for generating a holographic image of at least the one tangible input object of the tangible control mechanism for the device, with said generated holographic image for producing a response by said device corresponding to that produced conventionally by the one tangible input object of the tangible control mechanism; said image generator generating said holographic image of said one tangible input object such that it is larger than the one tangible input object of the tangible control mechanism;

an actuation detector for determining selection by the operator of said holographic image of said one tangible input object; and a signal generator for receiving the determination of said actuation detector and providing an input signal to the device thereby to produce the response.

2. A control arrangement according to claim 1, wherein the tangible control mechanism conventionally controlling said electronic or electro-mechanical device has a plurality of customarily touch-activated tangible input objects, physical contact with each of which produces a response by said device; wherein said image generator generates a holographic image of each of the plurality of tangible input objects of the tangible control mechanism such that it is larger than the corresponding tangible input object of the tangible control mechanism; and wherein each holographic image of each tangible input object is for producing a response by said device corresponding to that produced by the corresponding tangible input object of the tangible control mechanism.

3. A control arrangement according to claim 2, wherein any one of said holographic images of said plurality of tangible input objects can be selected by the operator, and wherein said actuation detector determines which of said holographic images of said plurality of tangible input objects is so selected by the operator.

4. A control arrangement as in claim 3, wherein said actuation detector comprises a look-up table for determining which of said holographic images of said plurality of tangible input objects is selected by the operator.

5. A control arrangement according to claim 4, wherein said signal generator receives the determination by said actuation detector and provides an input signal to the device that corresponds to the holographic image of the tangible input object selected by the operator.

6. A control arrangement according to claim 1, wherein said image generator comprises:

a mounting body;

a hologram of the tangible control mechanism connected to said mounting body; and means for illuminating said hologram to produce a holographic image of said tangible control mechanism at a predetermined location spaced from said mounting body.

7. A control arrangement according to claim 6, further comprising an image frame mounted to said mounting body and peripherally encompassing said holographic image.

8. A control arrangement according to claim 7, wherein said image frame comprises a rectangle approximately coplanar with said holographic image of said tangible control mechanism.

9. A control arrangement according to claim 8, wherein said actuation detector comprises a detection matrix incorporated into said image frame.

10. A control arrangement according to claim 7, wherein said actuation detector comprises a three dimensional active vision sensor.

11. A control arrangement according to claim 6, wherein said hologram is a transmission hologram, and wherein said illuminating means comprises an illumination source providing illumination from a position behind said transmission hologram relative to the operator.

12. A control arrangement according to claim 6, wherein said hologram is a reflection hologram, and wherein said illuminating means comprises an illumination source providing illumination from a position on the same side of said reflection hologram as said operator.

13. A control arrangement according to claim 6, wherein said hologram is a white-light hologram and said illumination means is a source of incoherent light.

14. A control arrangement according to claim 6, wherein said hologram is a conventional hologram and said illumination means is a source of coherent light.

15. A control arrangement according to claim 1, further comprising an output interface, said output interface including a video display device.

16. A control arrangement according to claim 1, wherein said image generator is arranged to generate a holographic image of another tangible control mechanism of a different electronic or electro-mechanical device.

17. A control arrangement according to claim 1, wherein said actuation detector comprises a wave source for producing waves selected from the group consisting of acoustic waves and electromagnetic waves.

18. A control arrangement as in claim 17, wherein said wave source is a laser and further comprises means for scanning emitted waves in a raster pattern across a plane of the holographic image.

19. A control arrangement for allowing an operator to control an electronic or electromechanical device of the type conventionally controlled by a tangible control mechanism having at least one customarily touch-activated tangible input object, physical contact with which produces a response by said device; said control arrangement allowing such control without the operator touching a solid object and comprising:

an image generator for generating a holographic image of the tangible control mechanism for the device, said generated holographic image including at least one image of at least one tangible input object corresponding to the one tangible input object of the tangible control mechanism and for producing a corresponding response by said device; said image generator comprising a physical structure, a hologram of the tangible control mechanism supported by said physical structure, and means for illuminating said hologram to project the holographic image at a predetermined location spaced from and independent of said physical structure, whereby the holographic image is free-floating from said physical structure;

an actuation detector for determining selection by the operator of said holographic image of said one tangible input object; and a signal generator for receiving the determination of said actuation detector and providing an input signal to the electronic or electromechanical device thereby to produce the response.

20. A control arrangement according to claim 19, wherein the tangible control mechanism conventionally controlling said device has a plurality of customarily touch-activated tangible input objects, physical contact with each of which produces a response by said device; wherein said image generator generates a corresponding holographic image of each of the plurality of tangible input objects of the tangible control mechanism; and wherein each holographic image of each tangible input object is for producing a response by said device corresponding to that produced by the corresponding tangible input object of the tangible control mechanism.

21. A control arrangement according to claim 20, wherein any one of said holographic images of said plurality of tangible input objects can be selected by the operator, and wherein said actuation detector determines which of said holographic images of said plurality of tangible input objects is so selected by the operator.

22. A control arrangement as in claim 21, wherein said actuation detector comprises a look-up table for determining which of said holographic images of said plurality of tangible input objects is selected by the operator.

23. A control arrangement according to claim 21, wherein said signal generator receives the determination by said actuation detector and provides an input signal to the device that corresponds to the holographic image of the tangible input object selected by the operator.

24. A control arrangement according to claim 19, wherein:
said physical structure comprises a mounting body;
said hologram of the tangible control mechanism is connected to said mounting body; and
said means for illuminating said hologram projects said holographic image of the tangible control mechanism at a predetermined location spaced from said mounting body.

25. A control arrangement according to claim 19, wherein said hologram is a transmission hologram, and wherein said illuminating means comprises an illumination source providing illumination from a position behind said transmission hologram relative to the operator.

26. A control arrangement according to claim 19, wherein said hologram is a reflection hologram, and wherein said illuminating means comprises an illumination source providing illumination from a position on the same side of said reflection hologram as said operator.

27. A control arrangement according to claim 19, wherein said hologram is a white-light hologram and said illumination means is a source of incoherent light.

28. A control arrangement according to claim 19, wherein said hologram is a conventional hologram and said illumination means is a source of coherent light.

29. A control arrangement according to claim 19, wherein said actuation detector comprises a three dimensional active vision sensor.

30. A control arrangement according to claim 19, further comprising an output interface, said output interface including a video display device.

31. A control arrangement as in claim 19, wherein said image generator is arranged to generate a holographic image of another tangible control mechanism of a different electronic or electromechanical device.

32. A control arrangement as in claim 19, wherein said actuation detector comprises a wave source for producing waves selected from the group consisting of acoustic waves and electromagnetic waves.

33. A control arrangement as in claim 32, wherein said wave source is a laser and further comprises means for real-time, three dimensional optical scanning of the region including and bounding the holographic image, in a raster pattern across the plane of the holographic image.

* * * * *

UNITED STATES PATENT AND TRADEMARK OFFICE
CERTIFICATE OF CORRECTION

PATENT NO. : 6,377,238 B1
DATED : April 23, 2002
INVENTOR(S) : Robert Douglas McPheters It is certified that error appears in the above-identified patent and that said Letters Patent is hereby corrected as shown below:

Title page,
Item [76], Inventor, "Robert Douglas McPheters, 330 E. 38th St., Apt. 17F, New York, NY (US) 10016" should read -- Robert Douglas McPheters, Esq., 10 Weed's Landing, Darien, CT (US) 08620-5043 --.

Column 5,
Line 1, "above listed" should read -- above-listed --.

Column 9,
Line 1, "electromechanical" should read -- electro-mechanical --.

Column 10,
Line 25, "electromechanical" should read -- electro-mechanical --.

Signed and Sealed this

Fourteenth Day of January, 2003

JAMES E. ROGAN
*Director of the United States Patent and Trademark Office*